(12) United States Patent
Yamaguchi et al.

(10) Patent No.: US 10,850,256 B2
(45) Date of Patent: Dec. 1, 2020

(54) INSOLUBILIZING AGENT FOR SPECIFIC TOXIC SUBSTANCES, METHOD FOR INSOLUBILIZING SPECIFIC TOXIC SUBSTANCES USING SAME, AND SOIL IMPROVING METHOD

(71) Applicant: YOSHINO GYPSUM CO., LTD., Tokyo (JP)

(72) Inventors: Masato Yamaguchi, Tokyo (JP); Shinichi Miura, Tokyo (JP); Yusuke Ichino, Tokyo (JP); Saburo Ishii, Toyonaka (JP); Kazuomi Kitsuda, Misato (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 16/119,723

(22) Filed: Aug. 31, 2018

(65) Prior Publication Data
US 2019/0015812 A1    Jan. 17, 2019

Related U.S. Application Data

(62) Division of application No. 14/389,154, filed as application No. PCT/JP2013/059285 on Mar. 28, 2013, now abandoned.

(30) Foreign Application Priority Data

Mar. 30, 2012  (JP) .............................. 2012-082209
Mar. 30, 2012  (JP) .............................. 2012-082210

(51) Int. Cl.
*B01J 20/08*    (2006.01)
*B09C 1/08*    (2006.01)
(Continued)

(52) U.S. Cl.
CPC ............. *B01J 20/08* (2013.01); *A62D 3/33* (2013.01); *B01J 20/045* (2013.01); *B09C 1/08* (2013.01);
(Continued)

(58) Field of Classification Search
CPC .. A62D 3/33; A62D 2101/24; A62D 2101/43; B09C 1/08; B09C 2101/00;
(Continued)

(56) References Cited

U.S. PATENT DOCUMENTS 3,183,194 A * 5/1965 Nakazawa ............... B01J 20/08
502/8
86,034,169   12/2013 Descamps et al.
(Continued)

FOREIGN PATENT DOCUMENTS

EP    0845306    6/1998
JP    56-037183    8/1981
(Continued)

OTHER PUBLICATIONS

European Office Action, issued in the corresponding European patent application No. 13768341.3, dated Jan. 11, 2019, 4 pages.
(Continued)

*Primary Examiner* — Joseph D Anthony
(74) *Attorney, Agent, or Firm* — Hamre, Schumann, Mueller & Larson, P.C.

(57) ABSTRACT

Provided is an insolubilizing material for a specific toxic substance useful for insolubilizing a heavy metal or the like conducted by applying the insolubilizing material for a specific toxic substance to soil or on the surface of the soil. The insolubilizing material, for a specific toxic substance, is used in a manner so that soil does not reach a strongly alkaline region of a pH of 11 or more. The insolubilizing material for a specific toxic substance comprises an amor-
(Continued)

phous aluminum compound or a derivative thereof as a main component. The insolubilizing material functions as a solidifying material. The insolubilizing material also comprises gypsum obtained by adding and mixing, to the gypsum, the amorphous aluminum compound or the derivative thereof in a range from 0.5 to 60 mass parts relative to 100 mass parts of the gypsum. A method for improving soil using the insolubilizing material is also disclosed.

14 Claims, 2 Drawing Sheets

(51) Int. Cl.
  *A62D 3/33*    (2007.01)
  *B01J 20/04*    (2006.01)
  *C01F 7/02*    (2006.01)
  *C04B 28/06*    (2006.01)
  *C04B 111/00*    (2006.01)
  *A62D 101/24*    (2007.01)
  *A62D 101/43*    (2007.01)

(52) U.S. Cl.
  CPC ............... *C01F 7/02* (2013.01); *C04B 28/06* (2013.01); *A62D 2101/24* (2013.01); *A62D 2101/43* (2013.01); *B09C 2101/00* (2013.01); *C04B 2111/00767* (2013.01); *Y02W 30/91* (2015.05)

(58) Field of Classification Search
  CPC ......... B01J 20/045; B01J 20/08; C04B 28/06; C04B 2111/00767; C04B 18/0445; C04B 18/0472; C01F 7/02; Y02W 30/91
  See application file for complete search history.

(56) References Cited

U.S. PATENT DOCUMENTS

| | | | |
|---|---|---|---|
| 2011/0253634 A1 | 10/2011 | Soane et al. | |
| 2012/0219519 A1* | 8/2012 | McLaughlin | B09B 3/0041 424/76.1 |
| 2012/0312194 A1 | 12/2012 | Riman et al. | |
| 2016/0082488 A1 | 3/2016 | Yamaguchi et al. | |
| 2016/0222291 A1 | 8/2016 | Sugano et al. | |

FOREIGN PATENT DOCUMENTS

| | | |
|---|---|---|
| JP | 09-019673 | 1/1997 |
| JP | 9-239339 | 9/1997 |
| JP | 10-244248 | 9/1998 |
| JP | 2001-253755 | 9/2001 |
| JP | 2002-326081 | 11/2002 |
| JP | 2003-236521 | 8/2003 |
| JP | 4680549 | 3/2006 |
| JP | 2006056989 | 3/2006 |
| JP | 4690729 | 7/2006 |
| JP | 2007044606 | 2/2007 |
| JP | 2007-330884 | 12/2007 |
| JP | 2008212771 | 9/2008 |
| JP | 2008-273994 | 11/2008 |
| JP | 2009030883 | 2/2009 |
| JP | 2009-051910 | 3/2009 |
| JP | 2009102518 | 5/2009 |
| JP | 2010-207659 | 9/2010 |
| JP | 2010-253440 | 11/2010 |
| JP | 2011-099079 | 5/2011 |
| JP | 2011200749 | 10/2011 |
| KR | 101035876 | 5/2011 |
| WO | 2009128490 | 10/2009 |
| WO | 2011038459 | 4/2011 |

OTHER PUBLICATIONS

Supplementary Partial European Search Report, issued in the corresponding European patent application No. 13768341.3, dated Nov. 27, 2015, 9 pages.
XP-002750856 WPI database, Thomson Scientific, London, GB week 200620, 3 pages.
Extended European Search Report, issued in the corresponding European patent application No. 13768341.3-1706, dated May 3, 2016, 13 pages.
Japanese Office Action, issued in the corresponding Japanese patent application No. 2013-068606, dated Sep. 20, 2016, 4 pages.
JPO Notice with third party observations, issued in the corresponding Japanese patent application No. 12013-068606, dated Dec. 20, 2016, 64 pages.
JPO Notice with third party observations, issued in the corresponding Japanese patent application No. 12013-068607, dated Dec. 20, 2016, 14 pages.
Canadian Office Action, issued in the corresponding Canadian patent application No. 2,868,518, dated Nov. 24, 2017, 5 pages.
"User Guidelines for Waste and Byproduct Materials in Pavement Construction", U.S. Department of Transportation Federal Highway Administration (Office of Research, Development, and Technology, Office of Safety, RDT), Mar. 9, 2011, 6 pages and available at: https://www.fhwa.dot.gov/publications/research/infrastructure/structures/97148/bfs1.cfm.
Ryan Barborak, "Calcium Aluminate Cement Concrete (Class CAC Concrete) TxDOT Special Specification SS-4491 Tip Sheet", Technical Advisory, Texas Department of Transportation, Construction and Bridge Divisions, Aug. 2010, 6 pages and available at: https://ftp.dot.state.tx.us/pub/txdot-info/cst/tips/calcium_concrete.pdf.
Second European Office Action, issued in the corresponding European patent application No. 13768341.3, dated Jul. 15, 2020, 4 pages.

* cited by examiner

[FIG. 1]
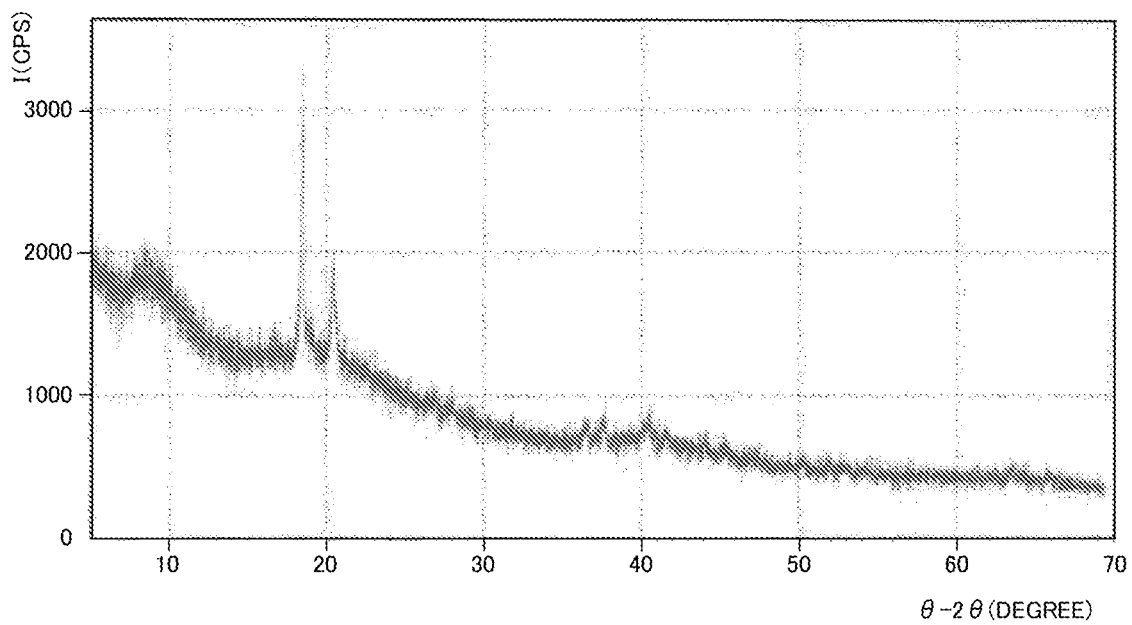

[FIG. 2]
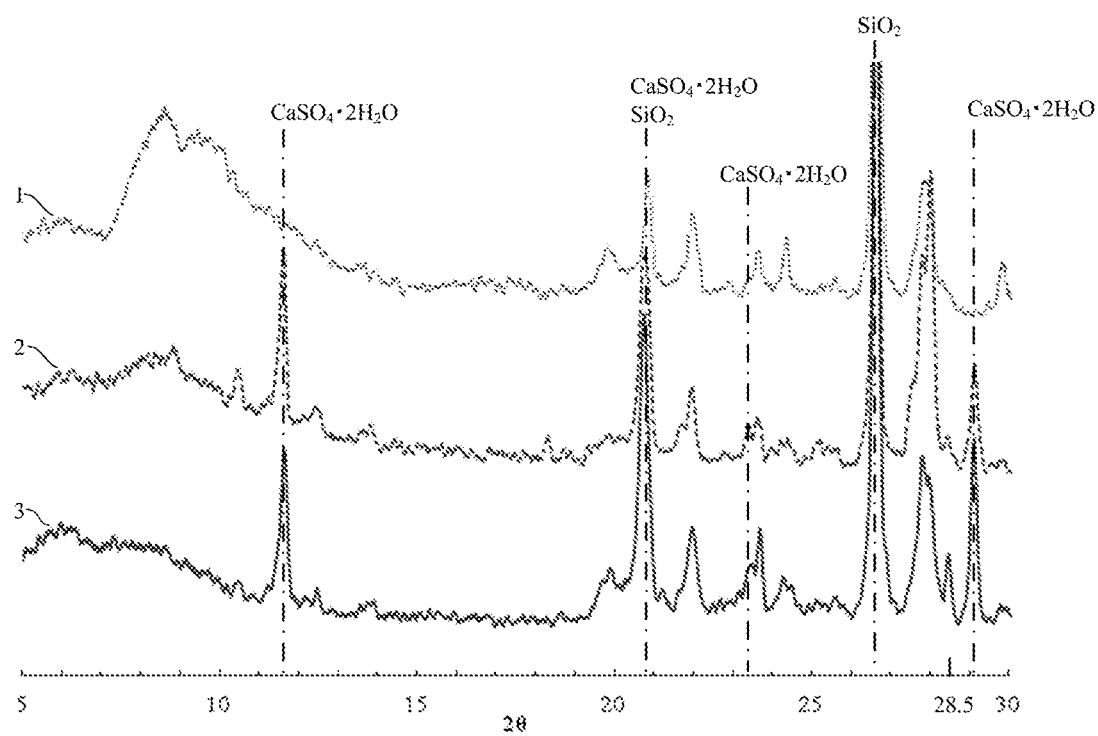
[FIG. 3]
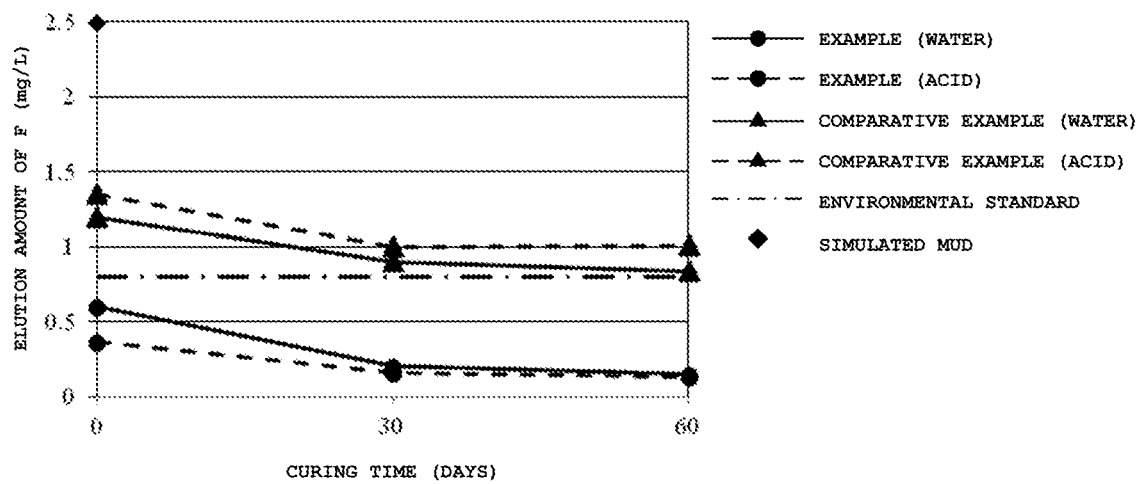

INSOLUBILIZING AGENT FOR SPECIFIC TOXIC SUBSTANCES, METHOD FOR INSOLUBILIZING SPECIFIC TOXIC SUBSTANCES USING SAME, AND SOIL IMPROVING METHOD

TECHNICAL FIELD the present invention relates to an economically excellent insolubilizing material for a specific toxic substance (hereinafter, also referred to as "heavy metal or the like"). Specifically, the first invention of the present invention relates to an insolubilizing material for a specific toxic substance (heavy metal or the like) capable of insolubilizing a specific toxic substance (heavy metal or the like) contained in soil such as soil at a site of an abolished plant and soil for landfill and suppressing re-elution of the specific toxic substance (heavy metal or the like) from treated matter, and also relates to a method for insolubilizing a specific toxic substance (heavy metal or the like) using the insolubilizing material for a specific toxic substance (heavy metal or the like). The second invention of the present invention relates to an insolubilizing material for a specific toxic substance (heavy metal or the like): comprising gypsum as an essential component; being useful particularly for treatment of soil to which soil the fluidity is imparted by adding mud and water thereto; in addition to the above effects, being capable of imparting, to treated matter, strength that is about the same as or more than the strength with which handling during transportation and landfill can easily be carried out; and functioning as a solidifying material, and also relates to a method for improving soil using the insolubilizing material for a specific toxic substance.

BACKGROUND ART a case may exist that contaminated soil contaminated by a heavy metal or the like is present at a site or the like of an abolished plant that has been in operation since the times when the health hazards due to the heavy metal or the like were not recognized. Moreover, the heavy metal or the like may also be contained in surplus soil for landfill due to the contaminated soil. In recent years, it has been known that the heavy metal or the like contained in such soil is eluted and intrude into ground water to cause a situation that threatens human health, and the importance of the technology to stably immobilize the heavy metal or the like in soil or the like has been recognized. Moreover, since alkaline soil mixed with mortar by a shield construction method at a construction site are frequently discharged for example, the surplus soil to be used for landfill is often alkaline. Against this problem, it is desired that the filled-up soil be neutral from the consideration to environment. Moreover, the surplus soil to be used for landfill such as large amount of sludge generated by waste water treatment and surplus soil waste from construction often has high water content ratio, and in the case where such soil is used for landfill, it often becomes necessary to solidify the mud. Moreover, in Japan where there are many volcanoes and that is surrounded by sea, the heavy metal or the like may be contained in natural strata and soil, and soil in the coastal area, and there is a case where insolubilization of the heavy metal or the like is needed in soil near the living space such as a residential area and a river-head area.

As described previously, since the need for preventing the elution of the heavy metal or the like from the soil at the site or the like of an abolished plant, or soil filled up with surplus soil has been recognized, the various types of insolubilizing materials for a heavy metal or the like have conventionally been used for the purpose of suppressing the elution of the heavy metal or the like, and the effects thereof have been confirmed. In addition, the "heavy metal or the like" in the present invention means that the "Heavy Metal or the like being Designated Hazardous Substance (class II specified chemical substance)" specified in Article 2 of Soil Contamination Countermeasures Act that came into effect in 2003, and specifically denotes the following compounds.

Cadmium and compounds thereof
Hexavalent chromium compounds
Cyanides
Mercury and compounds thereof (including alkyl mercury compounds)
Selenium and compounds thereof
Lead and compounds thereof
Arsenic and compounds thereof
Fluorine and compounds thereof
Boron and compounds thereof However, a case may exist that the conventional insolubilizing material for a heavy metal or the like needs solidifying treatment (imparting strength) separately because some treated matter after insolubilizing treatment comes into a state where the handling during transportation or landfill carried out after the insolubilizing treatment becomes difficult. On the other hand, cement based or lime based solidifying materials have generally been used for solidifying treatment of soil, however there is a problem that the soil after treatment shows alkalinity due to the use of the solidifying materials. Namely, the development of a solidifying material that makes the soil (treated matter) after treatment neutral from the consideration to environment is desired when it is taken into consideration that the treated matter treated with the above-described solidifying materials is used for landfill or the like after the treatment.

Here, there exists a method of utilizing a neutral gypsum based solidifying material as a method for conducting soil solidification in a neutral pH, however there is a problem that the treated matter is inferior in strength. Against this problem, a method of enhancing the strength of the treated matter by adding an aluminum compound and a calcium compound so as to generate ettringite when the solidifying material is mixed with the soil (see, Patent Literature 1). Furthermore, studies on utilizing, as a raw material for a cement based insolubilizing material, recycled gypsum that is separated and recovered from a waste gypsum board being a construction waste material, recycled gypsum that is derived from a waste gypsum mold, or the like (hereinafter, abbreviated as "waste gypsum") derived from recycled gypsum) have been made for the purpose of promoting recycling of a construction material. However, there may be a case that a heavy metal or the like such as fluorine and lead derived from the waste gypsum itself or another dismantled construction material mixed into the waste gypsum is contained in the waste gypsum. Therefore, there is a risk, attributable to the above-described case, that a situation where the elution amount of the heavy metal or the like exceeds the environmental standard value is brought about by using the gypsum based solidifying material utilizing waste gypsum. Since it is the biggest technological problem in the solubilizing material for a specific toxic substance to more effectively suppress the elution of the heavy metal or the like in the mud being an object of treatment and reduce the amount of the elution thereof, the occurrence of the above-described situation must be avoided even in the case where the heavy metal or the like derived from waste gypsum is present, and the development of an insolubilizing material for a heavy metal or the like having a higher effect is desired.

Under the above-described circumstances, as a method for making fluorine hardly soluble and stable against fluorine polluted soil or the like, for example, a method for making fluorine hardly soluble and stable by generating fluorinated apatite and ettringite with a material containing gypsum, lime, ferrous sulfate, and a phosphate compound has been proposed (see, Patent Literature 2). Moreover, the present applicants has so far made a proposal on a gypsum based insolubilizing and solidifying material for a heavy metal or the like, the gypsum based insolubilizing and solidifying material for a heavy metal or the like: capable of making the treated matter neutral; capable of insolubilizing a heavy metal or the like contained in the mud, and at the same time solidifying the heavy metal or the like, and imparting the strength to the mud to make the mud excellent in handling (see, Patent Literature 3) by using the gypsum based insolubilizing and solidifying material for a heavy metal or the like with the gypsum based insolubilizing and solidifying material for a heavy metal or the like mixed and added in the sludge generated by waste water treatment or the mud such as construction surplus soil. Specifically, the proposal on an insolubilizing and solidifying material for a heavy metal or the like in which an aluminum compound selected from aluminum hydroxide and so on and a neutralizing agent containing a calcium or magnesium component are contained in calcined gypsum has been made.

In contrast with the above-described development of the solidifying material, the development of a new material different from the conventional cement based, lime based, or gypsum based solidifying material is also progressing. For example, a method of utilizing hydraulic alumina, as a neutral solidifying material for water-containing soil suitable for solidifying water-containing soil such as dredged bottom mud and construction sludge, the hydraulic alumina produced through oxidation treatment by heating an aluminum compound comprising, as a main component, amorphous aluminum hydroxide produced as a by-product by neutralization and aggregation in a step of positive electrode oxidation treatment of aluminum has been proposed (see, Patent Literatures 4 and 5). It is taken in these literatures that water-containing soil can be solidified in a neutral state so as to have a sufficient strength by allowing the hydraulic alumina to contain an insolubilizing assistant (solidification strength-enhancing agent) such as lithium carbonate and calcium carbonate. Moreover, it is also taken in these literatures that the elution of a heavy metal such as hexavalent chromium can be prevented.

CITATION LIST

Patent Literature

Patent Literature 1: JP-A-2009-51910
Patent Literature 2: JP-A-2007-330884
Patent Literature 3: JP-A-2010-207659
Patent Literature 4: JP-B-4690729
Patent Literature 5: JP-B-4680549

SUMMARY OF INVENTION

Technical Problem

However, the technology described in Patent Literature 1 does not intend to insolubilize a heavy metal or the like, moreover since the generation of ettringite that contributes to enhancing the strength of the treated matter occurs in a strongly alkaline region, even if an assumption is made that there is a possibility that the heavy metal or the like is immobilized in the generated ettringite, there is a possibility that ettringite is decomposed under an acidic condition such as an acid rain to re-elute the heavy metal or the like.

In the same way, since fluorine is made hardly soluble and stable by generating ettringite in the technology described in Patent Literature 2, it is necessary to keep the pH alkaline, and therefore there has been a problem that the treated matter does not become neutral. Moreover, there is another problem that it is necessary to adjust the composition of the insolubilizing material according to the pH of the soil in the method of utilizing an acidic material and an alkaline material by mixing them as described in Patent Literature 2.

Moreover, neutral treated matter is obtained in the technology described in Patent Literatures 3 to 5, however the main object thereof is to solidify the mud, and there has been room for improvement from the standpoint of realizing more effective insolubilization of the heavy metal or the like and stable immobilization of various types of heavy metals and so on for a long period of time. For example, even though the low-cost gypsum is used as a raw material in Patent Literature 3, the neutralizing agent comprising an aluminum compound and a calcium or magnesium component is necessary, and therefore there is a problem from the stand point of providing a lower-cost and surer treatment method.

Moreover, although the raw material for obtaining hydraulic alumina is amorphous aluminum hydroxide produced as a by-product by neutralization and aggregation in the step of positive electrode oxidation treatment of aluminum in the technology described in Patent Literatures 4 and 5, it is required to conduct oxidation treatment by heating amorphous aluminum hydroxide, and therefore there is a big problem from the standpoint of economy of conducting treatment to a large amount of soil more surely with lower cost. Moreover, the hydraulic alumina has been developed as a solidifying material, it is hard to say that the hydraulic alumina is sufficient in terms of insolubilizing a heavy metal or the like, and there is also room for improvement in terms of this point.

Furthermore, as described below, there has been room for improvement in any of the technologies in terms of more surely achieving of stably immobilizing the heavy metal or the like that is immobilized in the treated matter for a long period of time in the treated matter that is used for landfill and is to be left in various environments in addition to more efficiently insolubilizing various types of the heavy metals and so on. Namely, according to the studies made by the present inventors, it has been hard to say that the current technologies can sufficiently and surely achieve the performance in terms of stably maintaining a further desired state where the heavy metal or the like that is insolubilized in the treated matter is stably insolubilized without re-elution against the acid rain even though the heavy metal or the like contained in the soil can be insolubilized and, as necessary, solidified to impart strength to the soil with the current technologies.

Moreover, it is considered that much of the heavy metal or the like is present near the surface of the polluted soil particularly at the site or the like of an abolished plant, so an insolubilizing material for a heavy metal or the like capable of immobilizing the heavy metal or the like by just spraying the insolubilizing material for a heavy metal or the like to apply on the surface of the soil with which insolubilizing material for a heavy metal or the like treatment becomes simple is extremely useful when developed.

Therefore, an object of the present invention is to provide a high performance insolubilizing material for a specific toxic substance (heavy metal or the like) in which the problems of the above-described conventional technologies are solved. Namely, an object of the present invention is to provide an economical insolubilizing material for a specific toxic substance capable of using a low-cost raw material in insolubilizing treatment conducted by adding and mixing an insolubilizing material to soil or insolubilizing treatment conducted by spraying an insolubilizing material on the surface of the soil, the insolubilizing material: capable of effectively insolubilizing and immobilizing a heavy metal or the like that is present in the soil or near the surfaces of the soil and gives influence on human health; capable of making treated matter neutral so as to be reusable and environment-friendly; furthermore without the re-elution of the heavy metal or the like even in the case where the treated matter is exposed to a neutral condition or acidic condition such as an acid rain; and therefore being practically valuable. Particularly, it is extremely useful when the waste the treatment of which has conventionally been a problem can be used as a raw material, and another object of the present invention is to provide an insolubilizing material for a specific toxic substance that is also extremely useful economically.

Furthermore, an object of the second present invention is to provide a practically valuable insolubilizing material for a specific toxic substance the treated matter of which is imparted strength and is easy to handle in soil treatment in addition to the above-described effects.

Solution to Problem

[First Invention of Present Invention]

The above-described objects can be achieved by the present invention. Namely, the first invention of the present invention provides an insolubilizing material for a specific toxic substance to be used so that soil does not reach a strongly alkaline region of a pH of 11 or more, wherein the insolubilizing material for a specific toxic substance comprises an amorphous aluminum compound or a derivative thereof as a main component, or, as an insolubilizing material having another constitution, an insolubilizing material for a specific toxic substance to be used so that soil does not reach a strongly alkaline region of a pH of 11 or more, wherein the insolubilizing material for a specific toxic substance comprises an amorphous aluminum compound or a derivative thereof as a main component and further comprises a calcium component exhibiting acidity, neutrality, or weak alkalinity of a pH of less than 11 when the calcium component makes contact with moisture contained in the soil.

Moreover, preferable embodiments of the first present invention of the present invention include that: the amorphous aluminum compound is amorphous aluminum hydroxide; the amorphous aluminum compound or the derivative thereof is derived from aluminum sludge and is to be used as it is, or obtained by dehydrating and drying, without changing the properties, an amorphous aluminum compound or the derivative thereof derived from aluminum sludge; the specific toxic substance is at least any one selected from the group consisting of cadmium and compounds thereof, hexavalent chromium compounds, cyanides, mercury and compounds thereof (including alkyl mercury compounds), selenium and compounds thereof, lead and compounds thereof, arsenic and compounds thereof, fluorine and compounds thereof, and boron and compounds thereof; the calcium component is at least any one selected from the group consisting of gypsum dihydrate, calcium carbonate, calcium peroxide, calcium fluoride, calcium iodide, calcium phosphate, calcium chloride, calcium nitrate, calcium acetate, calcium citrate, calcium gluconate, calcium malate, and calcium lactate.

Furthermore, another embodiment of the first invention of the present invention provides a method for insolubilizing a specific toxic substance, the method comprising conducting treatment to soil so that the soil does not reach a strongly alkaline region of a pH of 11 or more by adding and mixing, or spraying to the soil the insolubilizing material for a specific toxic substance to insolubilize the specific toxic substance.

Moreover, the preferable embodiments include: adding and mixing, or spraying to the soil the amorphous aluminum compound or the derivative thereof being a main component of the insolubilizing material for a specific toxic substance within a range of 0.5 to 50 g per 1 kg on a dry mass basis of the soil; and further preferably adding and mixing, or spraying to the soil the amorphous aluminum compound and the derivative thereof being a main component of the insolubilizing material for a specific toxic substance within a range of 10 to 40 g per 1 kg on a dry mass basis of the soil. Moreover, the preferable embodiments include: the specific toxic substance to be insolubilized is attributable to the soil or a constituent of the insolubilizing material; and the constituent of the insolubilizing material is a calcium component. In addition, the above-described dry mass means the mass of soil that is dried until the mass of the soil becomes a constant weight in a drying furnace at 110° C.±5° C. in accordance with "the method for water content of soils JIS A1203".

[Second Invention of Present Invention]

The above-described objects can be achieved by the following present invention. Namely, the second invention of the present invention provides an insolubilizing material for a specific toxic substance to be used so that soil containing a specific toxic substance does not reach a strongly alkaline region of a pH of 11 or more, the insolubilizing material for a specific toxic substance comprising calcined gypsum and functioning also as a solidifying material, wherein the insolubilizing material for a specific toxic substance comprising calcined gypsum is obtained by adding and mixing, to the calcined gypsum, an amorphous aluminum compound or the derivative thereof in a range of 0.5 to 60 mass parts relative to 100 mass parts of the calcined gypsum.

Moreover, the preferable embodiments of the second invention of the present invention include the followings. The amorphous aluminum compound is amorphous aluminum hydroxide; the amorphous aluminum compound or the derivative thereof is derived from aluminum sludge and is to be used as it is, or obtained by dehydrating and drying, without changing the properties, an amorphous aluminum compound or the derivative thereof derived from aluminum sludge; the insolubilizing material for a specific toxic substance is obtained by adding and mixing, to the calcined gypsum, the amorphous aluminum compound and the derivative thereof in a range of 15 to 50 mass parts relative to 100 mass parts of the calcined gypsum; and the specific toxic substance is at least any one selected from the group consisting of cadmium and compounds thereof, hexavalent chromium compounds, cyanides, mercury and compounds thereof (including alkyl mercury compounds), selenium and compounds thereof, lead and compounds thereof, arsenic and compounds thereof, fluorine and compounds thereof, and boron and compounds thereof.

Furthermore, another embodiment of the second invention of the present invention provides a method for improving soil, comprising conducting treatment to the soil containing a specific toxic substance so that the soil does not reach a strongly alkaline region of a pH of 11 or more by adding and mixing to the soil the aforementioned insolubilizing material for a specific toxic substance functioning also as a solidifying material. Moreover, the preferable embodiments include adding and mixing to the soil the insolubilizing material for a specific toxic substance within a range of 30 to 200 kg per 1 $m^3$ of the soil containing a specific toxic substance.

Advantageous Effects of Invention

[First Invention of Present Invention]

According to the first invention of the present invention, in the case where the insolubilizing material for a specific toxic substance is used so that soil does not reach a strongly alkaline region of a pH of 11 or more, namely, in a pH region where ettringite is not generated, an excellent insolubilizing material for a specific toxic substance to make the treated matter in which the heavy metal or the like that is present in the soil or near the surface of the soil are effectively insolubilized, and in which re-elution of the insolubilized heavy metal or the like is suppressed under both of neutral and acidic conditions is provided. Moreover, the insolubilizing material for a specific toxic substance of the first invention of the present invention is a simple insolubilizing material for a specific toxic substance with which the above-described effects are exhibited not only in the case of a method of conducting treatment by adding and mixing the insolubilizing material for a specific toxic substance to the soil but also just by spraying the insolubilizing material for a specific toxic substance to the surface of the soil. Furthermore, the treated matter is made neutral taking the environmental effects into consideration in the case where the treated matter is used for landfill or the like. Moreover, according to the present invention, aluminum sludge that is generated at an anodized aluminum plant or an aluminum sash plant, and most of which is taken as waste can effectively be utilized as the amorphous aluminum compound that characterizes the present invention, and therefore it becomes possible to provide an environmental friendly product.

[Second Invention of Present Invention]

According to the second invention of the present invention, the excellent insolubilizing material for a specific toxic substance: with which the heavy metal or the like is effectively insolubilized; that makes the treated matter in which the re-elution of the insolubilized heavy metal or the like in the treated matter is suppressed under both of neutral and acidic conditions, and that makes the state of the treated matter so that the treated matter has the solidification strength so as to be easy for handling at the time of transportation or landfill; and that functions also as a solidifying material in the case where the insolubilizing material for a specific toxic substance is used for insolubilizing treatment of the heavy metal or the like in the soil or mud under a condition that the soil or mud does not reach a strongly alkaline region of a pH of 11 or more. Particularly, the treated matter that is solidified by the insolubilizing material for a specific toxic substance is made neutral taking the influence on the environment when the treated matter is utilized as it is for landfill or the like. Moreover, according to the second invention of the present invention, aluminum sludge that is generated at an anodized aluminum plant or an aluminum sash plant, and most of which is taken as waste can effectively be utilized as the amorphous aluminum compound that characterizes the present invention and, in addition to this, the calcined waste gypsum can be utilized as a raw material for gypsum, and therefore the second present invention of the present invention can contribute the solution to a problem of recycling of a construction waste material, and it becomes possible to provide a further environmental friendly product.

BRIEF DESCRIPTION OF DRAWINGS

FIG. 1 is a measurement result of X-ray diffraction ($CuK_\alpha$ line) for dehydrated and dried aluminum sludge.

FIG. 2 is a graph illustrating the measurement results of X-ray diffraction ($CuK_\alpha$ line) for collected samples of the soil only, after 1 week of curing, and after 1 month of curing respectively when the insolubilizing material for a specific toxic substance of the present invention is mixed with the soil so that the soil does not reach a strongly alkaline region of a pH of 11 or more.

FIG. 3 is a graph illustrating elution test results under a neutral condition and an acidic condition for each of the treated matter in which an insolubilizing material for a specific toxic substance of the present invention and a cement solidifying material are used respectively.

DESCRIPTION OF EMBODIMENTS

Hereinafter, the present invention will be described in more detail giving preferable embodiments. The present inventors have made detailed studies as to the reason that the elution of the heavy metal or the like contained in the soil has not been able to be sufficiently suppressed and further the reason that the solidifying performance has not been stable when the solidifying function is imparted to the insolubilizing material for a specific toxic substance in the treatment of the soil that contains a heavy metal or the like in the past in order to solve the above-described conventional technical problems.

As a result of the studies, the present inventors have found that: the conventional insolubilizing material that has been used for the above-described insolubilizing treatment of the heavy metal or the like in the soil or mud has insufficient reactivity with the heavy metal or the like, and therefore there is a problem that the use amount becomes huge in order to thoroughly insolubilize the heavy metal or the like; and moreover even though the heavy metal or the like is thoroughly insolubilized during the treatment, immobilizing the heavy metal or the like in a state where the heavy metal or the like is stably insolubilized has not been achieved and the re-elution of the heavy metal or the like in the case where the treated matter is used for landfill or the like after treatment may be recognized.

Moreover, as described previously, it often happens that the conventional insolubilizing material or the conventional solidifying material that is used therewith shows alkalinity in itself, and therefore is insufficient in terms of environmental friendliness, which has been a big factor to make the treated matter difficult to utilize. Furthermore, the present inventors have recognized that there is a problem that when the treated matter is exposed to an acid condition such as acid rain in particular, the heavy metal or the like that is insolubilized is re-eluted from the treated matter, and this is remarkable in the case where the treated matter shows alkalinity. Moreover, the present inventors have confirmed that the problem of re-elution of the heavy metal or the like may occur similarly in the insolubilizing material for a specific toxic substance that also functions as a solidifying material. Furthermore, it is considered that much of the heavy metal or the like is present near the surface of the polluted soil particularly at the site or the like of an abolished plant, so it is extremely useful when an economically excellent insolubilizing material for a specific toxic substance capable of surely and stably immobilizing the heavy metal or the like by just spraying the insolubilizing material for a specific toxic substance to apply on the surface of the soil is developed. However, such an insolubilizing material has not yet been known.

[First Invention of Present Invention]

The present inventors have made further detailed studies based on the above-described findings, and as a result thereof, the present inventors have achieved the first invention of the present invention. Namely, the present inventors have reached the present invention by finding that when the amorphous aluminum compound or the derivative thereof (hereinafter, referred to as the amorphous aluminum compound) in particular among the aluminum compounds is added and mixed or sprayed to the soil, it becomes possible to provide the insolubilizing material for a heavy metal or the like: that is capable of more surely and stably insolubilizing the heavy metal or the like; further the treated matter of which is stably maintained in a state where the heavy metal or the like is not re-eluted and is immobilized even in the case where the treated matter is exposed to an acidic condition such as an acid rain; and that makes the treated matter neutral. In addition, the amorphous aluminum compound and a derivative thereof may be an aluminum compound which is recognized that the aluminum compound is in a state of an amorphous state by X-ray diffraction. Moreover, as will be described later, as the amorphous aluminum compound that is used in the present invention, the aluminum sludge that is generated from an anodized aluminum plant or an aluminum sash plant and most of which has been disposed of can be utilized as it is or in a state obtained by conducting a simple dehydration or air drying, and therefore the insolubilizing material for a specific toxic substance of the present invention becomes extremely economical in its material constitution.

Hereinafter, each material that constitutes the insolubilizing material for a specific toxic substance of the first invention of the present invention will be described.

(Amorphous Aluminum Compound)

The present inventors consider as follows from the verification results described later about the reason that the amorphous aluminum compound that characterizes the insolubilizing material for a specific toxic substance of the first invention of the present invention has been able to effectively immobilize the heavy metal or the like in the treated matter and also has been able to function as an excellent insolubilizing component that can effectively suppress the re-elution of the immobilized heavy metal or the like from the treated matter under both of the neutral condition and the acidic condition. When the insolubilizing material for a specific toxic substance or the like of the present invention is used so that the soil does not reach a strongly alkaline region of a pH of 11 or more, namely, in a pH region where ettringite is not generated, it is considered that a mineral other than the ettringite is generated by aluminum in the amorphous aluminum compound, a silica component or a calcium component contained in the soil being an object of treatment, and a component of a heavy metal or the like contained in the soil or the insolubilizing material itself, as a result thereof the heavy metal or the like in the soil is immobilized as a constituent of the mineral, and the excellent effects of the first invention of the present invention has been able to be achieved.

According to the detailed studies made by the present inventors, the amorphous aluminum compound is excellent in adsorbing ability of the heavy metal or the like when compared with the crystalline aluminum compound, and therefore the amorphous aluminum compound easily adsorbs the heavy metals or the like contained in the soil, in the surface of the soil, or in the insolubilizing material itself when added in the soil or to the surface of the soil. Furthermore, it is considered that in the process for the amorphous aluminum compound to change to be crystalline inside the soil, the amorphous aluminum compound takes in a silica component or a calcium component contained in the soil to form a mineral with the adsorbed heavy metal or the like, and as a result thereof, the heavy metal or the like has been able to be stably insolubilized. According to the studies made by the present inventors, the amorphous aluminum compound that characterizes the first invention of the present invention has a function of insolubilizing a specific toxic substance contained in the soil such as, for example, a heavy metal such as arsenic, selenium, cadmium, mercury, cyanogen, lead, and hexavalent chromium, and inorganic matter such as fluorine and boron and stably immobilizing the specific toxic substance contained in the soil in the treated matter.

The present inventors have mixed and cured the amorphous aluminum compound and the soil so that the soil does not reach a strongly alkaline region of a pH of 11 or more and have conducted a research on the properties of the solidified matter after curing in order to confirm the above-described function of the amorphous aluminum compound. Specifically, the X-ray diffraction for each of a sample of the soil only, a sample after 1 week of curing, and the sample after 1 month of curing used for the above-described test has been measured. The obtained results of the X-ray diffraction measurement are shown in FIG. 2. Reference numeral 1 in the figure shows the X-ray diffraction for the sample of the soil only, reference numeral 2 in the figure shows the X-ray diffraction for the sample after 1 week of curing, and reference numeral 3 in the figure shows the X-ray diffraction for the sample after 1 month of curing. In addition, in the above-described tests, the calcined gypsum was used together with the amorphous aluminum compound, and the reason for this is as follows. The components necessary for the insolubilizing technology of the present invention that has been proved as a result of the studies are calcium, silica, and aluminum, however, among these components, the amount of the calcium component supplied from the soil is extremely small as compared with the amorphous aluminum compound that is positively added and the silica component that is not positively added and supplied from the soil. On the other hand, the gypsum is a neutral material and therefore in the case where the gypsum is mixed and treated with the soil, the state of the soil does not reach a strongly alkaline region, and the treated matter can surely be made in a state where the calcium component is abundantly present, and therefore the gypsum is added in conducting the above-described tests. Thus, in the first invention of the present invention, it is also preferable that the constitution comprises the amorphous aluminum compound as a main component and further the calcium component such as the gypsum that shows acidity, neutrality, and a weak alkalinity of a pH of less than 11 when the calcium component makes contact with the moisture contained in the soil. Examples of the calcium component used in this case include at least any one selected from the group consisting of calcium carbonate, calcium peroxide, calcium fluoride, calcium iodide, calcium phosphate, calcium chloride, calcium nitrate, calcium acetate, calcium citrate, calcium gluconate, calcium malate, and calcium lactate in addition to the above-described gypsum. Moreover, in the case where the soil is acidic (the soil having a pH of 4 or less), calcium oxide and calcium hydroxide can also be used. The above-described gypsum is not particularly limited, however it is preferable that the gypsum is dihydrate gypsum that can be used without conducting calcination treatment. Moreover, even in the case where there is a concern over the presence of a heavy metal or the like attributable to the gypsum itself such as waste gypsum, such gypsum can be used because such heavy metals can also be immobilized stably in the treated matter.

As shown in FIG. 2, it has been confirmed that in the sample after 1 week of curing and further the sample after 1 month of curing, a peak that is clearly not attributable to the insolubilizing material, the gypsum used simultaneously, or the constituent of the soil appears near $2\theta=28.5°$. Moreover, when the result of the sample after 1 week of curing and the result of the sample after 1 month of curing are compared, the peak of the sample after 1 month of curing is higher than the peak of the sample after 1 week of curing regarding the peaks appeared around $2\theta=28.5°$. These facts show that some crystalline compound (mineral) has been generated in the treated matter by conducting the above-described treatment. In addition, from the results shown in FIG. 2, it has also been able to confirm that the characteristic peaks that correspond to ettringite ($2\theta=9.1°$ and $15.8°$) do not appear.

The present inventors have conducted synthesis of crystalline compounds having various compositional formulas considering, from the results obtained above, the constituents of the insolubilizing material for a specific toxic substance of the present invention and the soil components obtained by adding and mixing the insolubilizing material to the soil and have measured the X-ray diffraction for the obtained compounds. As a result thereof, it has been found that the obtained compound having a peak near $2\theta=28.5°$ is any one of $CaAl_2Si_6O_{16} \cdot 6H_2O$, $Ca(Si,Al)_{16}O_{32} \cdot 13H_2O$, $CaAl_2Si_7O_{18} \cdot 5.5H_2O$, $Ca_{12}Al_2Si_{18}O_{51} \cdot 18H_2O$, $CaAl_2Si_{10}O_{24} \cdot 7H_2O$, $(Ca, Na_2, K_2)Al_2Si_{10}O_{24} \cdot 7H_2O$, $CaAl_2Si_7O_{18} \cdot 6H_2O$, $CaAl_2Si_6O_{16} \cdot 4H_2O$, $Ca_3Al_2(SiO_4)(OH)_8$, and $Ca_3Al_2Si_3O_{12}$. These coincide with the chemical compositions of the mineral species, therefore it is considered that some crystalline compound (mineral) is generated by the treatment conducted using the insolubilizing material for a specific toxic substance of the present invention and as a result thereof the peak has appeared near $2\theta=28.5°$ in the X-ray diffraction.

As a result of the above-described studies, it has been proved that the components necessary for the insolubilizing technology of the present invention are calcium, silica, and aluminum, however as described previously, the amount of the calcium component is extremely small as compared with the silica component supplied from the soil, and therefore it is preferable that the insolubilizing material for a specific toxic substance of the first invention of the present invention comprises the amorphous aluminum compound and further the calcium component used together with the amorphous aluminum compound. In the present invention, the specific calcium component that is used together with the amorphous aluminum compound may be any calcium component as exemplified previously as long as the calcium component showing acidity, neutrality, or a weak alkalinity of a pH of less than 11 when the calcium component makes contact with the moisture contained in the soil. The reason is because when the calcium component that is used together with the amorphous aluminum compound is a compound as described above that does not reach a pH 11 or more (strong alkalinity) when the calcium component makes contact with the moisture contained in the soil, the insolubilizing treatment of the heavy metal or the like is made possible so that the soil does not reach a pH of 11 or more, namely, in a state where the ettringite is not generated in the case where the insolubilizing material of the present invention is used. Moreover, even in the case where the heavy metal or the like attributable to the calcium component to be used itself is present or in the case where there is a concern over the presence of a heavy metal or the like attributable to the calcium component to be used itself, the heavy metal or the like is supposed to be stably immobilized in the treated matter when the insolubilizing material for a specific toxic substance of the first invention of the present invention is used.

[Amorphous Aluminum Hydroxide]

According to further studies made by the present inventors, it is particularly preferable to use amorphous aluminum hydroxide as an amorphous aluminum compound in order to achieve the object of the first invention of the present invention in a high level. Moreover, examples of such a compound include volcanic ash soil and aluminum sludge that is generated at an anodic aluminum plant or an aluminum sash plant. Furthermore, surprisingly, it has been found that the remarkable effects of the present invention are obtained by using the aluminum sludge as it is or the dehydrated and dried aluminum sludge without changing the properties thereof in the present invention. According to the studies made by the present inventors, the aluminum sludge generated at the anodic aluminum plant or the aluminum sash plant has different properties depending on the process or the like, and it is difficult to specify the properties, however at least a large amount of amorphous aluminum hydroxide is contained. The present inventors have found that in the insolubilizing material of the first invention of the present invention, the material in which a large amount of such amorphous aluminum hydroxide is present is effective and usable, can insolubilize the heavy metal or the like, and the effect of stably suppressing the elution of the heavy metal or the like including the re-elution after the insolubilization are obtained.

Specifically, by just adding and mixing the aluminum sludge containing a large amount of amorphous aluminum hydroxide to the soil, or by just spraying the aluminum sludge containing a large amount of amorphous aluminum oxide to the surface of the soil, the elution of the heavy metal or the like from the treated matter is effectively suppressed, the treated matter is neutral, and further the immobilized heavy metal or the like is not re-eluted from the treated matter even when the treated matter is exposed to an acid condition such as an acid rain to say nothing of the case under a neutral condition. In the present invention, it is particularly preferable to use the aluminum sludge containing amorphous aluminum hydroxide as the amorphous aluminum compound that characterizes the first invention of the present invention as it is or by dehydrating and drying the aluminum sludge without changing the properties thereof. When such a material is used, more economical treatment is made possible. In the first invention of the present invention, it becomes necessary to use amorphous aluminum hydroxide contained in the aluminum sludge so as not to be oxidized, which is different from the technologies described in Patent Literatures 3 and 4. In addition, regarding the means in which amorphous aluminum hydroxide is not oxidized, any means that is currently conducted can appropriately be used. The measurement result of X-ray diffraction for the dehydrated and dried aluminum sludge is shown in FIG. 1.

It is considered that regarding the insolubilizing material for a specific toxic substance of the first invention of the present invention having the above-described constitution, although the detail is unclear as described previously, the amorphous aluminum compound adsorbs the heavy metal or the like contained in the soil, in the surface of the soil, or in the insolubilizing material itself, thereafter takes in the heavy metal or the like to make a mineral, thereby the heavy metal can stably be insolubilized, and as a result thereof, the remarkable effects of the first invention of the present invention have been obtained. The remarkable effects of the present invention can be confirmed by conducting elution tests under a neutral condition or an acidic condition as will be described later. Moreover, the amorphous aluminum compound that is used in the first invention of the present invention is insoluble to water, however it has been found that the amorphous aluminum compound is capable of functioning as a neutralizing agent by gently reacting with an alkali. Therefore, most of the soil or the like that is generated on the spot shows alkalinity, however it has been confirmed that in the case where treatment is conducted with the insolubilizing material for a specific toxic substance of the first invention of the present invention, the treated matter the pH of which is effectively kept in neutral is obtained.

The insolubilizing material for a specific toxic substance of the first invention of the present invention can effectively be used by adding and mixing to the soil, however the effects of the first present invention of the present invention are obtained and can simply be used also by spraying the insolubilizing material near the surface of the soil.

Next, preferable embodiments of the method for insolubilizing a specific toxic substance of the first invention of the present invention is described. The method for insolubilizing a specific toxic substance of the present invention is characterized in that treatment is conducted by adding and mixing or spraying the aforementioned insolubilizing material for a specific toxic substance of the first invention of the present invention to the soil, however it is preferable in the case to conduct adding and mixing or spraying of the insoluble material according to the following criteria. By doing in this way, the effects of the first invention of the present invention can sufficiently be obtained, and economical treatment is made possible. Namely, it is favorable that the addition amount of the insolubilizing material of the first invention of the present invention to the soil is to make the amount of the amorphous aluminum compound or the derivative thereof as a main component of the insolubilizing material for a specific toxic substance within a range of 0.5 to 50 g per 1 kg of dried mass of the soil, and it is more preferable that the addition amount of the insolubilizing material of the first invention of the present invention to the soil is to add and mix, or spray the amorphous aluminum compound or the derivative thereof within a range of 10 to 40 g per 1 kg of dried mass of the soil. It is not preferable that the amount of the amorphous aluminum compound or the derivative thereof to be added and mixed, or sprayed is less than 0.5 g because the amount is too small and therefore it is difficult for these compounds to be uniformly dispersed in the soil. On the other hand, even when the amorphous aluminum compound or the derivative thereof is added and mixed, or sprayed in an amount exceeding 50 g, it is difficult to obtain further effects, the cost becomes high, which is not economical. Moreover, in the case where the insolubilizing material of the first invention of the present invention is added and mixed to the soil, water may be added to the soil in an appropriate amount as necessary for the purpose of making the mixing operation easy. It is preferable that the pH of the treated soil is made so as to be in a range of 5.6 to 8.6 in addition to the above-mentioned criteria taking it into consideration that the treated matter is thereafter utilized for landfill or the like, however when the insolubilizing material for a specific toxic substance of the present invention is added and mixed by adjusting the amount thereof in the above-described manner, the pH value within the above-described range can be achieved without particularly adjusting the pH thereafter. As a result thereof, in the case where the elution test of the heavy metal or the like is conducted, for example, for the reclaimed soil utilizing the treated matter, the elution of the heavy metal or the like can more surely be suppressed.

[Second Invention of Present Invention]

Next, the insolubilizing material for a specific toxic substance of the second invention of the present invention that also functions as a solidifying material (hereinafter, also referred to as "the second insolubilizing material for a heavy metal or the like of the present invention") is described.

The present inventors have made further detailed studies based on the above-described findings, and as a result thereof have found, first of all, that it is effective to utilize the calcined gypsum to impart solidifying performance to the insolubilizing material for a specific toxic substance. The present inventors have found that when the amorphous aluminum compound and the derivative thereof (amorphous aluminum compound) in particular among the aluminum compounds is added and mixed to the calcined gypsum, it becomes possible to provide an insolubilizing material for a specific toxic substance with which: the elution of the heavy metal or the like can effectively be reduced; the heavy metal or the like is not re-eluted and is stably immobilized even when the treated matter is exposed to the acidic condition such as an acid rain; more favorable strength is imparted to the soil; and furthermore the treated matter is made neutral, and have reached the second invention of the present invention. In addition, the amorphous compound or the derivative thereof may be an aluminum compound that is recognized to be in an amorphous state by the X-ray diffraction. Moreover, in order to obtain excellent effects of the second invention of the present invention, it is particularly preferable that the amorphous aluminum compound is added to the calcined gypsum in a range of 0.5 to 60 mass parts, further in a range of 15 to 50 mass parts relative to 100 mass parts of the calcined gypsum. As will be described later, as the amorphous aluminum compound that is used in the present invention, the aluminum sludge that is generated at an anodized aluminum plant, an aluminum sash plant, or the like and most of which has been disposed of can be utilized as it is or in a state where simple dehydration or air drying is conducted. Furthermore, the waste gypsum against which there is a concern over the presence of the heavy atom or the like attributable to the material itself can effectively be utilized as a material, and therefore the insolubilizing material for a specific toxic substance of the second invention of the present invention becomes extremely economical in its material constitution.

Moreover, the insolubilizing material for a specific toxic substance of the second invention of the present invention comprising the above-described constitution becomes an insolubilizing material in which the calcined gypsum and the amorphous aluminum compound or the derivative thereof are uniformly mixed, and therefore the efficiency of the treatment operation can markedly be improved in the case where the insolubilizing material for a specific toxic substance of the second invention of the present invention is used.

Hereinafter, each material that constitutes the insolubilizing material for a specific substance of the second invention of the present invention is described.

(Gypsum)

As gypsum that is used in the second insolubilizing material for a specific toxic substance of the present invention, calcined gypsum excellent in the soil-solidifying performance is used. The calcined gypsum is ½ hydrate of calcium sulfate $[CaSO_4 \cdot \tfrac{1}{2}H_2O]$ and anhydride of calcium sulfate $[CaSO_4]$, and the solidifying performance of the second insolubilizing material for a specific toxic substance of the present invention can further be improved by using the calcined gypsum. Namely, the calcined gypsum chemically reacts with the moisture in the soil to easily change to dihydrate gypsum, and therefore the soil treated with the calcined gypsum solidifies to have strength. Examples of the calcined gypsum include β type hemihydrate gypsum, α type hemihydrate gypsum, calcium sulfate anhydrite II, calcium sulfate anhydrite III, or a mixture thereof, and any of them can be used. The hydration rate of calcium sulfate anhydrite II is sluggish when compared with that of other calcined gypsum, however calcium sulfate anhydrite II can be used. Natural gypsum, by-product gypsum, or waste gypsum may be used as raw material gypsum of the calcined gypsum. Natural gypsum and by-product gypsum among these are low-cost materials and preferable, however it is more preferable to use waste gypsum as a raw material taking higher-level economy and effective use of resources into consideration. As described previously, according to the second insolubilizing material for a specific toxic substance of the present invention, even in the case where there is a concern over the presence of the heavy metal or the like attributable to the material itself such as waste gypsum, the heavy metal or the like is supposed to be stably immobilized in the treated matter.

(Amorphous Aluminum Compound)

The present inventors consider the reason that the amorphous aluminum compound that constitutes the insolubilizing material for a specific toxic substance of the second invention of the present invention has been able to effectively immobilize the heavy metal or the like in the treated matter and to function as an excellent insolubilizing component with which the re-elution of the immobilized heavy metal or the like can effectively be suppressed under both of a neutral condition and an acidic condition as follows from the verification results described below. Namely, when the insolubilizing material for a specific toxic substance of the second invention of the present invention is used under a condition that soil containing the heavy metal or the like does not reach a strongly alkaline region of a pH of 11 or more, a mineral other than ettringite is generated by aluminum in the amorphous aluminum compound, calcium in the gypsum, a calcium component or silica component contained in the soil as an object of treatment, and a metal or the like contained in the soil or in the insolubilizing material itself, as a result thereof, the heavy metal or the like in the mud is immobilized as a constituent of the mineral, and as a result thereof the excellent effects of the second invention of the present invention has been able to be achieved. According to the detailed studies made by the present inventors, the amorphous aluminum compound is excellent in adsorbing ability of the heavy metal or the like when compared with the crystalline aluminum compound, and therefore the amorphous aluminum compound easily adsorbs the heavy metal or the like contained in the soil or the gypsum material that is a constituent of the solidifying material, when added into the soil. Furthermore, it is considered that in the process for the amorphous aluminum compound to change to be crystalline in the soil, the amorphous aluminum compound takes in the adsorbed heavy metal or the like to form a mineral, and as a result thereof, the heavy metal or the like has been able to be stably insolubilized. According to the studies made by the present inventors, the amorphous aluminum compound that characterizes the present invention has a function of insolubilizing a specific toxic substance contained in the soil such as, for example, a heavy metal such as arsenic, selenium, cadmium, mercury, lead, and hexavalent chromium, and inorganic matter such as fluorine and boron and also has a function of stably immobilizing the specific toxic substance contained in the soil in the treated matter.

The present inventors have mixed and cured the calcined gypsum, the amorphous aluminum compound, and the soil under a condition that the soil does not reach a strongly alkaline region of a pH of 11 or more and have conducted a research on the properties of the solidified matter after curing in order to confirm the above-described function of the amorphous aluminum compound. Specifically, the X-ray diffraction for each of a sample of the soil only, a sample after 1 week of curing, and the sample after 1 month of curing used for the above-described test has been measured. The obtained results of the X-ray diffraction measurement are shown in FIG. 2. Reference numeral 1 in the figure shows the X-ray diffraction for the sample of the soil only, reference numeral 2 in the figure shows the X-ray diffraction for the sample after 1 week of curing, and reference numeral 3 in the figure shows the X-ray diffraction for the sample after 1 month of curing.

As shown in FIG. 2, it has been confirmed that in the sample after 1 week of curing and further the sample after 1 month of curing, a peak that is clearly not attributable to the insolubilizing material, or the constituent of the soil appears near $2\theta=28.5°$. Moreover, when the result of the sample after 1 week of curing and the result of the sample after 1 month of curing are compared, the peak of the sample after 1 month of curing is higher than the peak of the sample after 1 week of curing regarding the peaks appeared around $2\theta=28.5°$. These facts show that some crystalline compound (mineral) during the treatment has been generated by conducting the above-described treatment. In addition, from the results shown in FIG. 2, it has been confirmed that the characteristic peaks that correspond to ettringite ($2\theta=9.1°$ and $15.8°$) do not appear.

The present inventors have conducted synthesis of crystalline compounds having various compositional formulas considering, from the results obtained above, the constituents of the insolubilizing material for a specific toxic substance of the second invention of the present invention and the soil components obtained by adding and mixing the insolubilizing material to the soil and have measured the X-ray diffraction for the obtained compounds. As a result thereof, it has been found that the compound having a peak near $2\theta=28.5°$ is any one of $CaAl_2Si_6O_{16} \cdot 6H_2O$, $Ca(Si,Al)_{16}O_{32} \cdot 13H_2O$, $CaAl_2Si_7O_{18} \cdot 5.5H_2O$, $Ca_{12}Al_2Si_{18}O_{51} \cdot 18H_2O$, $CaAl_2Si_{10}O_{24} \cdot 7H_2O$, $(Ca, Na_2, K_2)Al_2Si_{10}O_{24} \cdot 7H_2O$, $CaAl_2Si_7O_{18} \cdot 6H_2O$, $CaAl_2Si_6O_{16} \cdot 4H_2O$, $Ca_3Al_2(SiO_4)(OH)_8$, and $Ca_3Al_2Si_3O_{12}$. These coincide with the chemical compositions of the mineral species, therefore it is considered that some crystalline compound (mineral) is generated by the treatment conducted using the insolubilizing material of the second invention of the present invention and as a result thereof the peak derived from the mineral has appeared near $2\theta=28.5°$ in the X-ray diffraction.

[Amorphous Aluminum Hydroxide]

According to further studies made by the present inventors, it has been found that it is particularly preferable to use amorphous aluminum hydroxide as an amorphous aluminum compound in order to achieve the object of the second invention of the present invention in a high level. Examples of such a compound include an aluminum component contained in volcanic ash soil and aluminum sludge that is generated at an anodic aluminum plant or an aluminum sash plant. Furthermore, surprisingly, the remarkable effects of the second present invention of the present invention are obtained by using the aluminum sludge as it is or dehydrated and the dried aluminum sludge without changing the properties thereof together with the gypsum to make a solidifying material in the second invention of the present invention. According to the studies made by the present inventors, the aluminum sludge that is generated at the anodic aluminum plant or the aluminum sash plant has different properties depending on the process or the like, and it is difficult to specify the properties, however at least a large amount of amorphous aluminum hydroxide is contained. The present inventors have found that in the insolubilizing material for a specific toxic substance of the second invention of the present invention, the material in which a large amount of such amorphous aluminum compound is present is effective, can insolubilize the heavy metal or the like, and the effect of stably suppressing the elution of the heavy metal or the like including the re-elution after the insolubilization is obtained.

Specifically, in the second invention of the present invention, by using the aluminum sludge containing a large amount of amorphous aluminum hydroxide together with the calcined gypsum and just adding and mixing the aluminum sludge containing a large amount of amorphous aluminum hydroxide and the calcined gypsum to the soil, the elution of the heavy metal or the like from the treated matter is effectively suppressed, the treated matter is neutral, further the immobilized heavy metal or the like is not re-eluted from the treated matter even when the treated matter is exposed to an acid condition such as an acid rain to say nothing of the case under a neutral condition, and furthermore the treated matter is made so as to have solidified strength to the extent in which handling is easy at the time of transportation or landfill even when the soil is the sludge generated by waste water treatment or the mud such as construction surplus soil. Particularly in the present invention, the aluminum sludge containing amorphous aluminum hydroxide as an amorphous aluminum compound that constitutes the second invention of the present invention can be used as it is or by dehydrating and drying the aluminum sludge without changing the properties thereof, and by doing in this way, the economical treatment in terms of materials to be used is made possible. In the second invention of the present invention, the above-described things means that it is necessary to use amorphous aluminum hydroxide contained in the aluminum sludge so as not to be oxidized, which is different from the technologies described in Patent Literatures 1 and 2. In addition, regarding the means with which amorphous aluminum hydroxide is not oxidized, any means that is currently conducted can appropriately be used.

The measurement result of X-ray diffraction for the dehydrated and dried aluminum sludge is shown in FIG. 1.

The insolubilizing material for a specific toxic substance of the second invention of the present invention comprises the above listed amorphous aluminum compound externally added to the calcined gypsum in a range of 0.5 to 60 mass parts relative to 100 mass parts of the calcined gypsum. Namely, with the insolubilizing material for a specific toxic substance of the second invention of the present invention in which the addition amount of the amorphous aluminum compound relative to 100 mass parts of the calcined gypsum is less than 0.5 mass parts, the effect of insolubilizing the heavy metal or the like cannot sufficiently be obtained when blended in the soil as a solidifying material, and on the other hand the insolubilizing material for a specific toxic substance of the second invention of the present invention in which the addition amount of the amorphous aluminum compound relative to 100 mass parts of the calcined gypsum is mixed in an amount exceeding 60 mass parts becomes high in the material cost and becomes not economical. It is more preferable that the amorphous aluminum compound is added to the calcined gypsum in a range of 15 to 50 mass parts relative to 100 mass parts of calcined gypsum.

It is preferable that the insolubilizing material for a specific toxic substance of the second invention of the present invention having the above-described constitution and functions also as a solidifying material is utilized particularly in the case of conducting solidifying treatment by adding and mixing the insolubilizing material to the mud, and the aforementioned remarkable effects of the present can be obtained. It is considered that the reason for this is, although the detail is unclear as described previously, that the amorphous aluminum compound that is contained in the insolubilizing material together with the gypsum such as calcined gypsum adsorbs the heavy metal or the like in the soil to thereafter make a mineral from the heavy metal or the like in the soil, thereby the heavy metal has been able to stably be insolubilized. The remarkable effects of the second invention of the present invention obtained by the insolubilizing material for a specific toxic substance obtained by adding the amorphous aluminum compound to the gypsum can be confirmed by conducting an elution test under a neutral condition or an acidic condition. Moreover, the amorphous aluminum compound that is used in the second invention of the present invention is insoluble to water, however it has been found that the amorphous aluminum compound is capable of functioning as a neutralizing agent by gently reacting with an alkali. Therefore, most of the mud that is generated on the spot shows alkalinity, however it has been confirmed that in the case where the mud is solidified with the second insolubilizing material for a specific toxic substance of the present invention, the treated matter the pH of which is effectively maintained in neutral is obtained.

Next, preferable embodiments of the method for improving soil of the present invention using the insolubilizing material for a specific toxic substance of the second invention of the present invention that functions also as a solidifying material is described. The method for improving soil of the second invention of the present invention is characterized in that solidifying treatment is conducted simultaneously with the insolubilization of the heavy metal or the like by adding and mixing the second insolubilizing material for a specific toxic substance of the present invention to the soil. It is preferable to conduct adding and mixing of the insolubilizing material in the case by the following criteria. By doing in this way, the effects of the present invention can sufficiently be obtained, and economical treatment is made possible. Namely, regarding the addition amount of the second insolubilizing material for a specific toxic substance of the present invention, depending on the water content ratio of the soil or the required solidification strength of the treated soil, it is preferable that 30 to 200 kg of the insolubilizing material for a specific toxic substance per 1 $m^3$ of the soil containing a specific toxic substance is added and mixed. By doing in this way, the elution of the heavy metal or the like is suppressed, and the cone index after the solidifying material of the present invention is added and mixed evenly to the soil, solidification is conducted, and the resultant mixture is cured for 1 day becomes 100 $kN/m^2$ or more, preferably 150 $kN/m^2$ or more, more preferably 200 $kN/m^2$ or more. It is preferable that the pH of the solidified soil is made so as to be in a range of 5.6 to 8.6 in addition to the above-mentioned criteria taking it into consideration that the treated matter is thereafter utilized for landfill or the like, however the second insolubilizing material for a specific toxic substance of the present invention is added and mixed by adjusting the amount in the above-described manner to achieve the pH of the solidified soil. As a result thereof, the elution of the heavy metal or the like from the soil can more surely be suppressed at a place where the treated matter is utilized for landfill.

In carrying out the method for improving soil of the second invention of the present invention, when water is sprayed to the soil in advance to impart a certain extent of fluidity to the soil, and thereafter the second insolubilizing material for a specific toxic substance of the present invention is added and mixed to the soil, the mixing operation becomes easy. The second insolubilizing material for a specific toxic substance of the present invention has soil-solidifying performance, and therefore the treated matter is solidified to the extent that handling is easy at the time of transportation or landfill even in the case where the treatment is conducted after imparting the fluidity to the soil by spraying water to the soil as described above. Therefore, in carrying out the method for improving soil of the second invention of the present invention to the sludge that is generated by waste water treatment or the mud such as surplus soil waste from construction, treatment may be conducted adding and mixing the second insolubilizing material for a specific toxic substance of the present invention to the mud without dehydration or the like.

[Test Method Used in Present Invention]

The measurement of each value described above was carried out by the method described hereinafter in accordance with each test method shown hereinafter.

(1) Test Method for Water Content: In Accordance with "Test Method for Water Content of Soils JIS $Al_2O_3$".

The water content w (%) is calculated by the following equation.

$$w=(m_a-m_b)\times 100/(m_b-m_c)$$

$m_a$: mass of sample and vessel (g)
$m_b$: mass of furnace-dried sample and vessel (g)
$m_c$: mass of vessel (g)

(2) Elution Test of the Ministry of Environment Notification No. 18 (2003) (Hereinafter Also Referred to as "No. 18 Test"

The soil to be an object is dried, passed through a 2 mm sieve, and furthermore, using water as a solvent, 10 times the amount of water to the passed dried soil is added to prepare a test sample. The test sample is mixed by shaking at 200 times/min with a shaking width of 4 to 5 cm for 6 hours continuously. Thereafter, centrifugal separation and filtration were conducted, and then the obtained filtrate was used as a sample for measurement. Metal analysis in the sample was conducted in accordance with the methods for respective metals standardized by JIS.

(3) Long Term Stability Test

The elution test in an acidic condition was conducted in the same manner as described above except that the above-described water as a solvent was changed to a 0.769 mmol/L sulfuric acid aqueous solution (measured pH value=2.9). The reason that the elution test was conducted in the above-described condition using a sulfuric acid solution as a solvent as described herein is that the acid rain occurred in the natural world where the treated matter is left to stand was supposed. Specifically, the above-described condition was calculated out as the case where the treated matter is supposed to be exposed to an environment with an annual rainfall of 2000 mm having a pH of 4.0 for 100 years [in accordance with Geo-Environmental Protection Center Technical Standard "Leaching Test for Heavy Metals-Immobilized Soil Using Acid or Alkaline Solution" (hereinafter referred to as the "Acid Addition Elution Test")].

(4) pH Test: In Accordance with "the Method for pH of Suspended Soils JGS0211"

A sample is placed in a beaker, and water is added so that the mass ratio of water (including water in the sample) to the dried mass of the sample becomes 5. The sample is suspended with a stirring rod and is left still for 30 minutes or more and 3 hours or less to make a sample solution. The pH is measured by a glass electrode pH meter after the sample solution in the beaker is stirred.

(5) Cone Index Test: In Accordance with "Test Method for Cone Index of Compacted Soils JIS A1228"

First of all, a soil sample that is passed through a 9.5 mm sieve is placed in a mold having an inner diameter of 10 cm in accordance with JIS A1210 and is rammed down in three layers with 25 times per 1 layer using a rammer having a mass of 2.5 kg. Next, a cone penetrometer is stood vertically in the center of an upper end face of a test sample and is penetrated at a rate of 1 cm/sec, and the penetration resistance forces are determined from the readings of a load measuring apparatus when the tip of the cone is penetrated to 5 cm, 7.5 cm, and 10 cm from the end face of the test sample respectively. The cone index $q_c$ ($kN/m^2$) is calculated out by the following equation from the average penetration resistance $Q_c$ (N) and the base area A ($cm^2$) of the tip of the cone.

$$q_c=Q_c\times 10/A$$

EXAMPLES

Next, the present invention will be described specifically giving Examples of the present invention and Comparative Examples.

[First Invention of Present Invention]
<Preparation of Evaluation Sample>

Soil that was dried to become a constant weight in a drying furnace at 110° C.±5° C. was prepared. And arsenic and fluorine were added to the soil to prepare simulated polluted soil so that the elution amount of arsenic became 0.1 mg/L and the elution amount of fluorine became 2.5 mg/L.

<Evaluation 1>

Insolubilizing arsenic and fluorine in the soil using the insolubilizing material for a specific toxic substance of the first invention of the present invention was conducted, as Examples 1-1 to 1-4, by adjusting the water content ratio of 1 kg of the simulated polluted soil obtained above to 40% and adding and mixing amorphous aluminum hydroxide to be added changing the amounts thereof as shown in Table 1 respectively to the simulated polluted soil. Moreover, the example in which amorphous aluminum hydroxide was not used was denoted as Comparative Example 1-1, and the examples in which aluminum hydroxide and aluminum chloride were respectively used in place of amorphous aluminum hydroxide used in Examples and treatment was conducted by adding and mixing 10 g of these compounds respectively to 1 kg of the above-described dried simulated polluted soil were denoted as Comparative Examples 1-2 and 1-3 respectively.

TABLE 1

Sample Preparation

| | Kind | Addition amount (g) |
|---|---|---|
| Example 1-1 | Amorphous aluminum hydroxide | 0.5 |
| Example 1-2 | Amorphous aluminum hydroxide | 10 |
| Example 1-3 | Amorphous aluminum hydroxide | 40 |
| Example 1-4 | Amorphous aluminum hydroxide | 50 |
| Comparative Example 1-1 | Not Added | — |
| Comparative Example 1-2 | Aluminum hydroxide | 10 |
| Comparative Example 1-3 | Aluminum chloride | 10 |

Specifically, insolubilizing treatment was conducted by adding a desired amount of each of the insolubilizing materials for a specific toxic substance of the above-described Examples and Comparative Examples to the simulated soil as an object of treatment and thereafter sufficiently kneading the resultant mixture. After 1 day of curing after the treatment, the elution amount of arsenic and fluorine from the treated soil and the pH of the treated soil were measured. The measurement at the time was conducted by the afore-mentioned method. The obtained results are shown in Table 2. As shown in Table 2, it was confirmed that the elution of arsenic and fluorine was suppressed in any of the cases where the insolubilizing material for a specific toxic substance of Examples was used. Furthermore, it was confirmed that the treated matter was neutral. Moreover, regarding the treated matter for which the insolubilizing material for a specific toxic substance of Examples of the first invention of the present invention was used, when the treated matter to which the above-described treatment had been conducted was left to stand for six month and then the elution amount of arsenic and the elution amount of fluorine were measured in the same manner as described above, it was confirmed that the measured values shown in Table 2 were maintained.

TABLE 2

Elution Test Results

| | Elution amount (mg/L) | | pH |
|---|---|---|---|
| | Arsenic | Fluorine | (—) |
| Example 1-1 | 0.050 | 1.25 | 7.45 |
| Example 1-2 | 0.005 | 0.72 | 7.30 |
| Example 1-3 | <0.005 | 0.45 | 7.25 |
| Example 1-4 | <0.005 | 0.41 | 7.25 |
| Comparative Example 1-1 | 0.10 | 2.50 | 7.50 |
| Comparative Example 1-2 | 0.09 | 2.48 | 7.20 |
| Comparative Example 1-3 | 0.09 | 2.47 | 5.90 |
| Environmental standard | 0.01 or less | 0.8 or less | 5.8-8.6 |

<Evaluation 2>

Furthermore, treatment of insolubilizing the following heavy metals was conducted in the same manner as in Example 1-2 using amorphous aluminum hydroxide being the insolubilizing material for a specific toxic substance of Examples, and the obtained treated matter was evaluated by conducting the elution test. Specifically, lead, hexavalent chromium, and selenium were added to prepare simulated polluted soil in which the elution amount of lead was adjusted to 0.1 mg/L, the elution amount of hexavalent chromium was adjusted to 0.5 mg/L, and the elution amount of selenium was adjusted to 0.1 mg/L, and the water content ratio was adjusted to 40%. And the insolubilizing material for a specific toxic substance was added and kneaded in the soil in the same manner as in Example 1-2 in Evaluation 1, and thereafter the elution test was conducted. Moreover, the treatment similar to Example 1-2 was conducted using each of the afore-mentioned compounds that were used in Comparative Examples 1-1 to 1-3. As a result thereof, regarding any of the metals, it was confirmed that the effect of insolubilization was clearly obtained when compared with Comparative Examples in the case where the insolubilizing material for a specific toxic substance of Example 1-2 was used.

TABLE 3

Elusion Test Results

| | Elution amount (mg/L) | | |
|---|---|---|---|
| | Lead | Hexavalent chromium | Selenium |
| Example 1-2 | <0.005 | 0.02 | <0.005 |
| Comparative Example 1-1 | 0.10 | 0.50 | 0.10 |
| Comparative Example 1-2 | 0.08 | 0.50 | 0.09 |
| Comparative Example 1-3 | 0.09 | 0.49 | 0.09 |
| Environmental Standard | 0.01 or less | 0.05 or less | 0.01 or less |

Example 1-5 and Comparative Example 1-4

An insolubilizing material for a specific toxic substance of Example 1-5 of the first invention was prepared by adding 100 mass parts of calcined gypsum to 25 mass parts of aluminum sludge containing a large amount of amorphous aluminum hydroxide as an amorphous aluminum compound for the purpose of adding a calcium component and giving a solidifying function. The elution test of heavy metals after treatment was conducted using a commercial cement solidifying material for comparison. Using each material, to 1600 kg (1 m$^3$) of the simulated mud of an object of treatment, 100 kg of each material was added, thereafter treatment was conducted by sufficiently kneading the resultant mixture. Thereafter, curing was conducted for 60 days. And the No. 18 test and the acid addition elution test were conducted collecting a sample on the first day, on the 30th day, and on the 60th day respectively. The obtained test results are shown in FIG. 3.

As it is clear from FIG. 3, it was confirmed that the elution amounts were clearly different between the case where the insolubilizing material for a specific toxic substance of Example 1-5 of the first invention was used and the case where the solidifying material of Comparative Example 1-4 was used, and that the elution amount of fluorine was markedly smaller in the case where the insolubilizing material for a specific toxic substance of Example 1-5 was used than in the case where the solidifying material of Comparative Example 1-4 was used. Moreover, in the case where the insolubilizing material for a specific toxic substance of Example 1-5 was used, the elution amount as a result of conducting the elution test using a sulfuric acid solution as a solvent was rather small as compared with the case of the elution by water at an initial stage after the treatment. On the other hand, in the case where the solidifying material of Comparative Example 1-4 was used, the elution amount clearly became greater in the acidic condition using a sulfuric acid solution than in the case where water was used as a solvent, and it was shown that there was a problem of re-eluting the immobilized heavy metal or the like in particular.

Example 1-6

An insolubilizing material for a specific toxic substance of Example 1-6 was prepared by adding 100 mass parts of calcined gypsum using, as a raw material, waste gypsum in which fluorine was recognized to be contained to 25 mass parts of aluminum sludge containing a large amount of amorphous aluminum hydroxide as an amorphous aluminum compound for the purpose of adding a calcium component and giving a solidifying function. The insolubilizing material for a specific toxic substance of Example 1-6 was sprayed on the surface of the soil to cure for 60 days. And the elution test was conducted in the same manner as in Example 1-5 sampling, on the first day and on the 60th day, a portion of the insolubilizing material from the surface of the soil where the insolubilizing material was sprayed. As a result thereof, it was confirmed that the elution amount from the sample on the 60th day was clearly reduced as compared with the elution amount from the sample on the first day.

[Second Invention of Present Invention]

Next, the present invention will be described specifically giving Examples of the second invention of the present invention and Comparative Examples. In addition, the "parts" in the following description are based on mass unless otherwise noted.

<Preparation of Evaluation Samples of Examples 2-1 to 2-4 and Comparative Example 2-1>

The insolubilizing materials for a specific toxic substance of Examples and Comparative Example each having a combination shown in Table 4 using calcined gypsum and an amorphous aluminum compound were prepared. As the calcined gypsum, pulverized and calcined waste gypsum was used for each insolubilizing material. And as the amorphous aluminum compound, amorphous aluminum hydroxide (a chemical agent) was used.

TABLE 4

| Sample Preparation | | |
|---|---|---|
| | Combination (parts) | |
| | Calcined gypsum | Amorphous aluminum hydroxide |
| Example 2-1 | 100 | 0.5 |
| Example 2-2 | 100 | 15 |
| Example 2-3 | 100 | 50 |
| Example 2-4 | 100 | 60 |
| Comparative Example 2-1 | 100 | 0 |

<Evaluation 1>

The evaluation was conducted using simulated polluted mud in which the water content ratio was adjusted to 40% and arsenic and fluorine were added to adjust the elution amount of arsenic to 0.1 mg/L and adjust the elution amount of fluorine to 2.5 mg/L. And operations of insolubilizing arsenic and fluorine in the simulated polluted mud were conducted respectively using: insolubilizing materials of Examples 2-1 to 2-4 each obtained by adding amorphous aluminum hydroxide to gypsum so as to have a combination as shown in Table 4 by changing the amount of amorphous aluminum hydroxide; and a solidifying material of Comparative Example 2-1 in which the amorphous aluminum compound was not contained.

Specifically, to 1 m$^3$ of the simulated mud of an object of treatment, 100 kg of each of the insolubilizing materials for a specific toxic substance of Examples or the solidifying material of Comparative Example was added, and thereafter insolubilizing treatment was conducted by sufficiently kneading the resultant mixture. After curing of 1 day after the treatment, the elution amount of arsenic and the elution amount of fluorine from the mud in the No. 18 test and the solidification strength (cone index) were measured respectively. The measurement at the time was conducted by the aforementioned method. The obtained results are shown in Table 5.

As shown in Table 5, it was able to be confirmed from the elution test results for the treated matter in the case where the insolubilizing material for a specific toxic substance of Examples of the second invention of the present invention was used that the elution of arsenic and fluorine was suppressed by using the insolubilizing material for a specific toxic substance of Examples and the insolubilizing material for a specific toxic substance of Examples was useful as an insolubilizing material for a specific toxic substance. Furthermore, it was confirmed that the second insolubilizing material for a specific toxic substance of the present invention was useful also as a solidifying material. More specifically, it was found that the solidification strength (cone index) of the treated matter was in an extent that makes handling easy, had strength of a state where the treated matter was easy to be reusable, and had a greater cone index value when compared with the case where the solidifying material of Comparative Example in which amorphous aluminum hydroxide was not contained was used and therefore the treated matter having a higher strength was obtained. This means that the second insolubilizing material for a specific toxic substance of the present invention using an amorphous aluminum compound was more useful also as a solidifying material when compared with a conventional gypsum solidifying material. Moreover, the treated matter to which the above-described treatment had been conducted was left to stand for 6 months, and the elution amount of arsenic and the elution amount of fluorine in the No. 18 test were measured respectively in the same manner as described above. As a result thereof, it was confirmed that regarding the treated matter obtained by the solidifying material of Examples of the second invention of the present invention, the measured values shown in Table 5 were maintained and that the elution of the heavy metal or the like in the case where the treated matter was used for landfill or the like can effectively be suppressed. Furthermore, the pH of the treated matter is in a neutral region, and also from this standpoint, landfill treatment considering environmental conservation becomes possible.

TABLE 5

Results of Evaluation 1 (Elution Test Results-1)

|  | Elution amount (mg/L) | | Cone index (kN/m$^3$) | pH (—) |
| --- | --- | --- | --- | --- |
|  | Arsenic | Fluorine | | |
| Example 2-1 | 0.035 | 1.20 | 210 | 7.15 |
| Example 2-2 | 0.006 | 0.74 | 240 | 7.10 |
| Example 2-3 | <0.005 | 0.49 | 300 | 7.04 |
| Example 2-4 | <0.005 | 0.45 | 320 | 7.04 |
| Comparative Example 2-1 | 0.08 | 2.50 | 205 | 7.20 |
| Environmental standard | 0.01 or less | 0.8 or less | — | 5.8-8.6 |

<Evaluation 2>

Furthermore, evaluation was conducted by conducting the elution test for representative heavy metals using the insolubilizing material for a specific toxic substance of Example 2-2 and the solidifying material of Comparative Example 2-1. Specifically, lead, hexavalent chromium, and selenium were added to prepare simulated polluted mud in which the elution amount of lead was adjusted to 0.1 mg/L, the elution amount of hexavalent chromium was adjusted to 0.5 mg/L, and the elution amount of selenium was adjusted to 0.1 mg/L, then an insolubilizing material for a specific toxic substance or a solidifying material was added and kneaded in the simulated mud in the same manner as in Evaluation 1, and thereafter the elution test was conducted. As a result thereof, as shown in Table 6, regarding any of the metals, it was found that the effect of capable of insolubilizing these metals was clearly obtained in the case where the insolubilizing material for a specific toxic substance of Example 2-2 was used when compared with the case where the solidifying material of Comparative Example 2-1 was used.

TABLE 6

Results of Evaluation 2 (Elution Test Results-2)

|  | Elution amount (mg/L) | | |
| --- | --- | --- | --- |
|  | Lead | Hexavalent chromium | Selenium |
| Example 2-2 | <0.005 | 0.025 | <0.005 |
| Comparative Example 2-1 | 0.085 | 0.450 | 0.085 |
| Environmental standard | 0.01 or less | 0.05 or less | 0.01 or less |

Example 2-5 and Comparative Example 2-2

An insolubilizing material for a specific toxic substance of Example 2-5 was prepared at a rate of 25 mass parts of aluminum sludge containing a large amount of amorphous aluminum hydroxide as an amorphous aluminum compound to 100 mass parts of calcined gypsum. The elution test of heavy metals was conducted using a commercial cement solidifying material for comparison. Using these materials, to 1 m$^3$ of the simulated mud of an object of treatment, 100 kg of the solidifying material was added, thereafter treatment was conducted by sufficiently kneading the resultant mixture. Thereafter, curing was conducted for 60 days. And the No. 18 test and the acid addition elution test were conducted collecting a sample on the first day, on the 30th day, and on the 60th day respectively. The obtained test results are shown in FIG. 3.

As it is clear from FIG. 3, it was confirmed that the elution amounts were clearly different between the case where the insolubilizing material for a specific toxic substance of Example 2-5 was used and the case where the solidifying material of Comparative Example 2-2 was used, and that the elution amount of fluorine was markedly smaller in the case where the insolubilizing material for a specific toxic substance of Example 2-5 was used than in the case where the solidifying material of Comparative Example 2-2 was used. Moreover, in the case where the insolubilizing material for a specific toxic substance of Example 2-5 was used, the elution amount as a result of conducting the elution test using a sulfuric acid solution as a solvent was rather small as compared with the case of the elution by water at an initial stage after the treatment. On the other hand, in the case where the solidifying material of Comparative Example 2-2 was used, the elution amount clearly became greater in the acidic condition using a sulfuric acid solution than in the case where water was used as a solvent, and it was shown that there was a problem of re-eluting the immobilized heavy metal or the like in particular.

INDUSTRIAL APPLICABILITY

[First Invention of Present Invention]

Application examples of the present invention include an insolubilizing material for a specific toxic substance suitable for soil treatment capable of surely insolubilizing a heavy metal or the like contained in the soil or near the surface of the soil; without re-elution of the insolubilized heavy metal or the like from the treated matter even when the treated matter is exposed to rain or an acid rain after the insolubilization; capable of stably insolubilizing the heavy metal or the like utilizing a component contained in the soil; and stably making the treated matter neutral. Application examples of the present invention further include an economically excellent insolubilizing material for a specific toxic substance that makes it possible to effectively utilize waste gypsum and aluminum sludge both of which mostly become waste, and the utilization is expected, and since the treatment method using the insolubilizing material is extremely simple, the utilization is expected.

[Second Invention of Present Invention]

Application examples of the present invention include an insolubilizing material for a specific toxic substance suitable for soil treatment capable of surely insolubilizing a heavy metal or the like contained in the soil; without re-elution of the insolubilized heavy metal or the like from the treated matter even when the treated matter is exposed to rain or an acid rain after the insolubilization; capable of stably insolubilizing the heavy metal or the like in the soil; further capable of also imparting strength to the soil by solidification, and stably making the treated matter neutral. Application examples of the present invention further include an economically excellent insolubilizing material for a specific toxic substance that makes it possible to effectively utilize waste gypsum and aluminum sludge both of which mostly become waste, and the utilization is expected.

The invention claimed is:

1. A method for insolubilizing a specific toxic substance, the method comprising:
   conducting a treatment of soil so that the soil does not reach a strongly alkaline region in a range of pH 11 or more by adding to and mixing with, or spraying to the soil, an insolubilizing material so as to insolubilize the specific toxic substance,
   wherein the insolubilizing material comprises:
     an amorphous aluminum compound, or a derivative thereof, or a combination thereof, as a main component; and calcined gypsum, or gypsum dihydrate, or a combination thereof, as a calcium component, and the insolubilizing material insolubilizes the specific toxic substance without forming ettringite.

2. The method for insolubilizing a specific toxic substance according to claim 1, wherein the insolubilizing material is added to and mixed with, or sprayed to the soil in an amount in a range from 0.5 to 50 g per 1 kg on a dry mass basis of the soil.

3. The method for insolubilizing a specific toxic substance according to claim 1, wherein the insolubilizing material is added to and mixed with, or sprayed to the soil in an amount in a range from 10 to 40 g per 1 kg on a dry mass basis of the soil.

4. The method for insolubilizing a specific toxic substance according to claim 1, wherein the specific toxic substance to be insolubilized is attributable to the soil, and if the specific toxic substance also is present in the insolubilizing material, both the specific toxic substance in the soil and the specific toxic substance in the insolubilizing material are insolubilized.

5. The method for insolubilizing a specific toxic substance according to claim 1, wherein the amorphous aluminum compound, or the derivative thereof, or the combination thereof is amorphous aluminum hydroxide or a derivative thereof, or a combination thereof.

6. The method for insolubilizing a specific toxic substance according to claim 1, wherein the insolubilizing material insolubilizes the specific toxic substance by adsorbing the specific toxic substance, and forming a mineral other than ettringite with the specific toxic substance, wherein the mineral other than ettringite comprises the insolubilizing material and the specific toxic substance.

7. The method for insolubilizing a specific toxic substance according to claim 1, wherein the amorphous aluminum compound is derived from aluminum sludge, and the amorphous aluminum compound in the insolubilizing material is present (a) in the aluminum sludge as it is or (b) in a dehydrated and dried state of the aluminum sludge without changing properties of the aluminum sludge.

8. The method for insolubilizing a specific toxic substance according to claim 1, wherein the specific toxic substance is at least one material selected from the group consisting of cadmium and compounds thereof, hexavalent chromium compounds, cyanides, mercury and compounds thereof, which may be alkyl mercury compounds, selenium and compounds thereof, lead and compounds thereof, arsenic and compounds thereof, fluorine and compounds thereof, and boron and compounds thereof.

9. The method for insolubilizing a specific toxic substance according to claim 1, wherein the calcium component further comprises at least one material selected from the group consisting of calcium carbonate, calcium peroxide, calcium fluoride, calcium iodide, calcium phosphate, calcium chloride, calcium nitrate, calcium acetate, calcium citrate, calcium gluconate, calcium malate, and calcium lactate.

10. A method for improving soil, comprising:

conducting a treatment of the soil comprising a specific toxic substance so that the soil does not reach a strongly alkaline region in a range of pH 11 or more by adding to and mixing with the soil, an insolubilizing material so as to insolubilize the specific toxic substance, wherein the insolubilizing material comprises:

an amorphous aluminum compound or a derivative thereof or a combination thereof as a main component; and calcined gypsum, or gypsum dihydrate, or a combination thereof, as a calcium component, the insolubilizing material for a specific toxic substance is obtained by adding and mixing; to the calcium component, the amorphous aluminum compound or the derivative thereof or the combination thereof in a range from 0.5 to 60 mass parts relative to 100 mass parts of the calcium component, the insolubilizing material insolubilizes the specific toxic substance without forming ettringite, and the insolubilizing material solidifies the soil.

11. The method for improving soil according to claim 10, wherein the insolubilizing material is added to and mixed with the soil, in an amount in a range from 30 to 200 kg relative to 1 $m^3$ of the soil containing the specific toxic substance.

12. The method for improving soil according to claim 10, wherein the insolubilizing material comprises the amorphous aluminum compound, or the derivative thereof, or the combination thereof in a range from 15 to 50 mass parts relative to 100 mass parts of the calcium component.

13. The method for improving soil according to claim 10, wherein the calcium component comprises calcined gypsum.

14. The method for improving soil according to claim 12, wherein the calcium component comprises calcined gypsum.

* * * * *